(12) United States Patent
Ellison et al.

(10) Patent No.: US 7,374,232 B2
(45) Date of Patent: May 20, 2008

(54) HANGER BEAM ASSEMBLY

(75) Inventors: Patrick Ellison, Dublin, OH (US);
Matthew Wolfe, Powell, OH (US);
Eric Boettcher, Columbus, OH (US);
Masahiro Ishikawa, Dublin, OH (US);
Takashi Nakano, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 21 days.

(21) Appl. No.: 11/469,088

(22) Filed: Aug. 31, 2006

(65) Prior Publication Data

US 2008/0054680 A1    Mar. 6, 2008

(51) Int. Cl.
*B62D 25/14* (2006.01)
(52) U.S. Cl. ............ 296/193.02; 280/779; 280/795; 296/72
(58) Field of Classification Search ............ 296/24.34, 296/70, 72, 193.02, 193.07, 204; 280/779, 280/795
See application file for complete search history.

(56) References Cited

U.S. PATENT DOCUMENTS

| | | | |
|---|---|---|---|
| 4,355,820 A * | 10/1982 | Kitagawa et al. ............ 280/779 |
| 4,362,319 A | 12/1982 | Masaki et al. |
| 4,709,943 A * | 12/1987 | Yoshimura et al. ......... 280/751 |
| 4,767,153 A * | 8/1988 | Kawasaki et al. ..... 296/193.02 |
| 4,826,234 A * | 5/1989 | Komatsu .................... 296/70 |
| 5,238,286 A | 8/1993 | Tanaka et al. |
| 5,564,769 A * | 10/1996 | Deneau et al. ................ 296/72 |
| 5,685,598 A * | 11/1997 | Inoue et al. ................... 296/72 |
| 5,752,718 A * | 5/1998 | Schnabel et al. ........... 280/752 |
| 5,931,520 A | 8/1999 | Seksaria et al. |
| 6,155,631 A | 12/2000 | Yoshinaka et al. |
| 6,176,544 B1 | 1/2001 | Seksaria et al. |
| 6,203,092 B1 | 3/2001 | Yoshinaka |
| 6,213,504 B1 * | 4/2001 | Isano et al. ................. 280/748 |
| 6,322,122 B2 * | 11/2001 | Burns et al. ................ 296/24.3 |
| 6,394,527 B2 * | 5/2002 | Ohno et al. ................... 296/72 |
| 6,450,533 B1 | 9/2002 | Kimura et al. |
| 6,523,878 B2 | 2/2003 | Scheidel |
| 6,648,402 B2 * | 11/2003 | Scheib et al. .......... 296/203.02 |
| 6,685,259 B1 | 2/2004 | Shimase et al. |
| 6,843,521 B1 * | 1/2005 | Oana ............................ 296/70 |
| 6,851,742 B1 | 2/2005 | Kubiak |

(Continued)

FOREIGN PATENT DOCUMENTS

DE    19728557 A1 *    1/1998    ............ 296/193.02

(Continued)

*Primary Examiner*—Dennis H. Pedder
*Assistant Examiner*—Paul A Chenevert
(74) *Attorney, Agent, or Firm*—Rankin, Hill & Clark LLP; Mark E. Duell

(57) ABSTRACT

A hanger beam assembly is formed from aluminum and includes first and second support brackets, a main beam hanger, a driver beam, a main beam, a main beam support, and a main beam support mounting bracket. The driver beam extends between the first support bracket and the main beam hanger. The main beam extends between the main beam hanger and the second support bracket. The main beam support bracket is secured to a vehicle floor, and the main beam support is secured between the main beam hanger and the main beam support mounting bracket. The resulting hanger beam assembly is light-weight and provides a desired natural frequency at the associated steering wheel.

18 Claims, 8 Drawing Sheets

U.S. PATENT DOCUMENTS

| | | | |
|---|---|---|---|
| 2002/0050726 A1* | 5/2002 | Okana et al. | 296/70 |
| 2002/0056982 A1* | 5/2002 | Brownlee et al. | 280/779 |
| 2004/0135400 A1* | 7/2004 | Matsuzaki et al. | 296/193.02 |
| 2004/0150251 A1* | 8/2004 | Matsutani | 296/193.02 |
| 2005/0179243 A1 | 8/2005 | Baudart | |
| 2005/0217913 A1 | 10/2005 | Sakamoto | |
| 2006/0017310 A1* | 1/2006 | Joo et al. | 296/193.02 |
| 2007/0222200 A1* | 9/2007 | Kukubo | 280/779 |

FOREIGN PATENT DOCUMENTS

| | | | | |
|---|---|---|---|---|
| DE | 10029813 A1 | * | 1/2002 | 296/193.02 |
| DE | 1004043202 A | * | 3/2006 | 296/193.02 |
| EP | 479630 A1 | * | 4/1992 | 296/193.02 |
| EP | 1 717 130 A1 | | 11/2006 | |
| EP | 1 842 714 A1 | | 10/2007 | |
| FR | 2859446 A | * | 3/2005 | 296/193.02 |
| JP | 58218476 A | * | 12/1983 | 296/FOR. 111 |
| JP | 01240383 A | * | 9/1989 | 280/779 |
| KR | 2001055953 A | * | 7/2001 | 296/193.02 |
| WO | WO 0170558 A | * | 9/2001 | 296/193.02 |

* cited by examiner

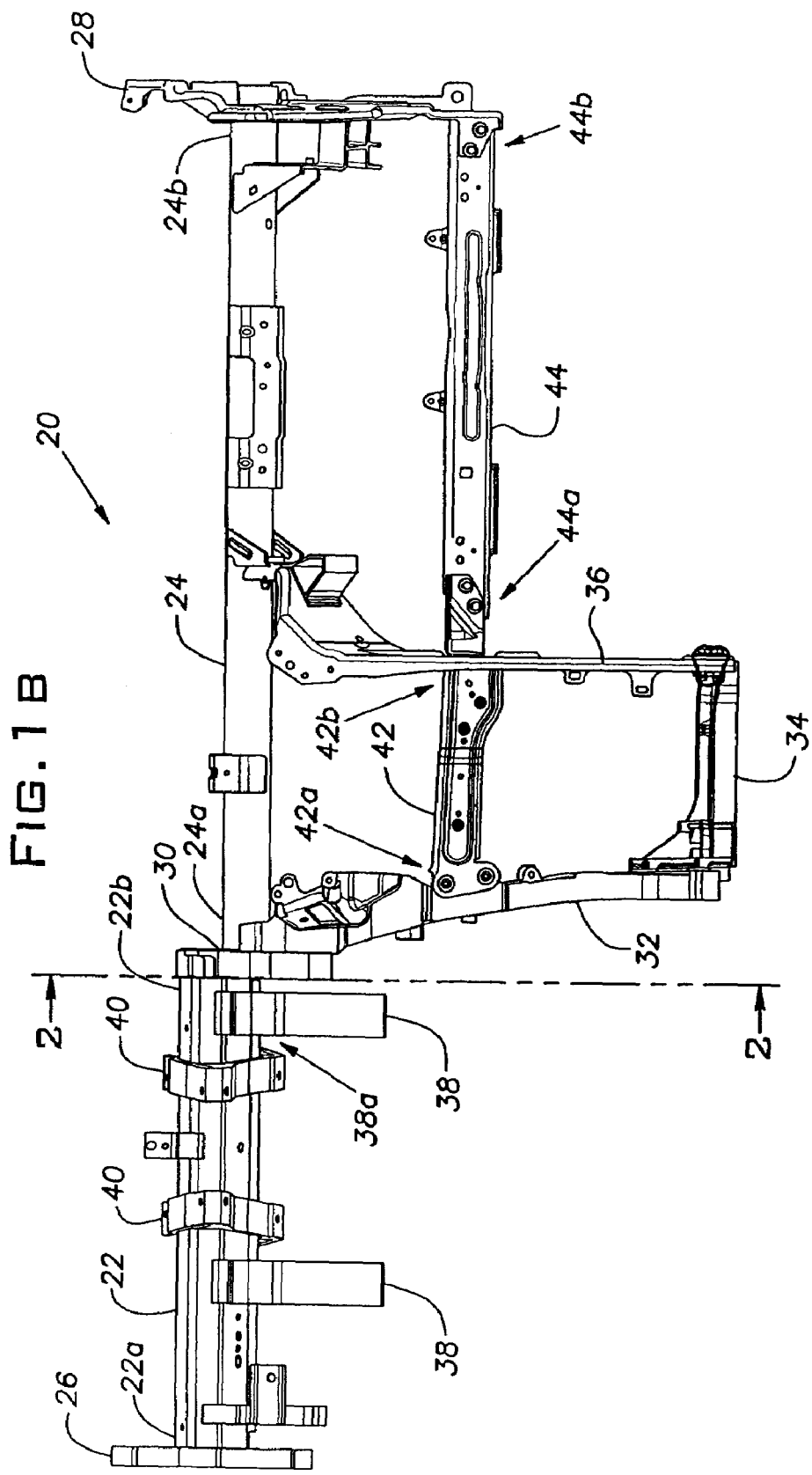

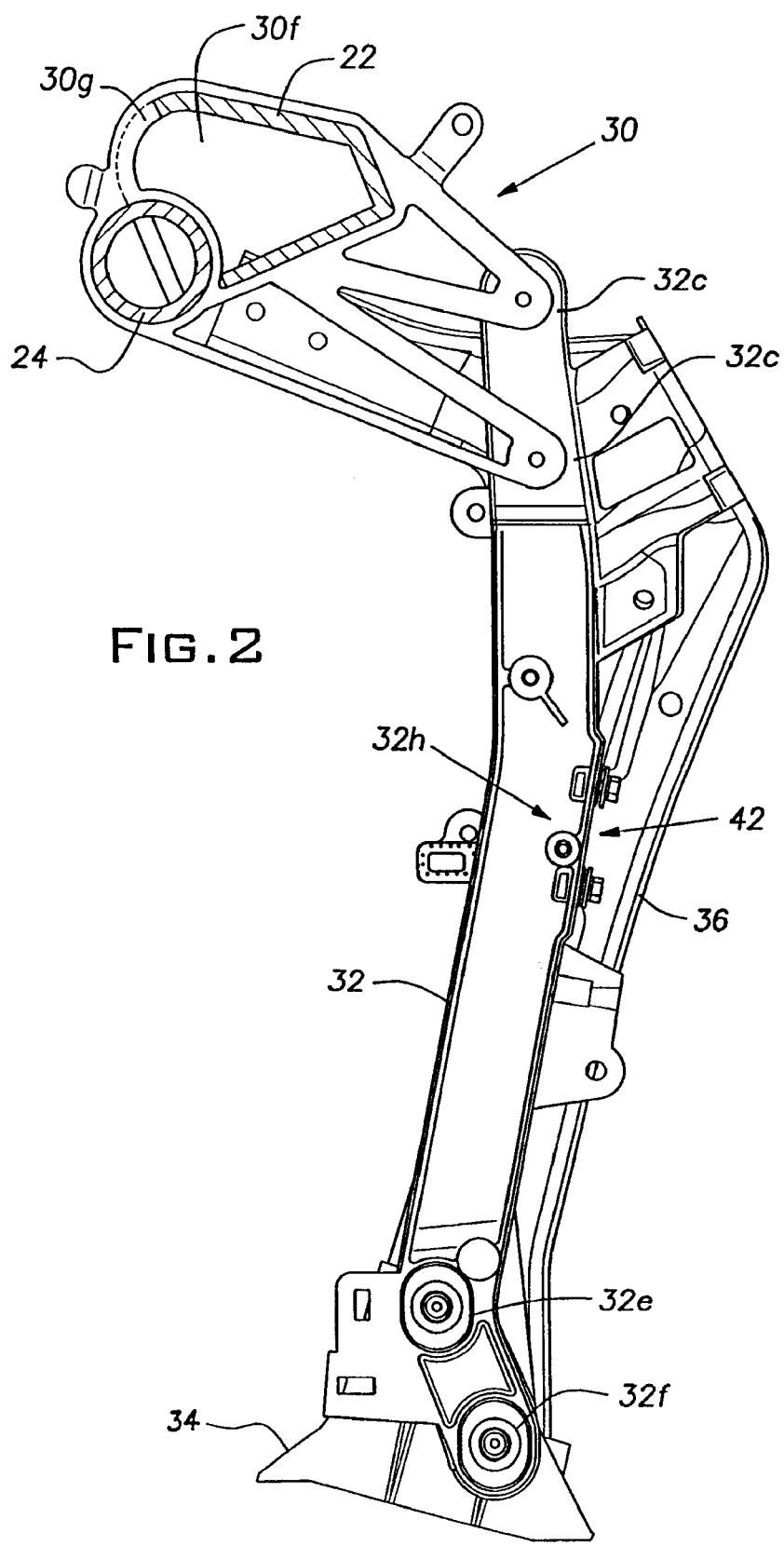

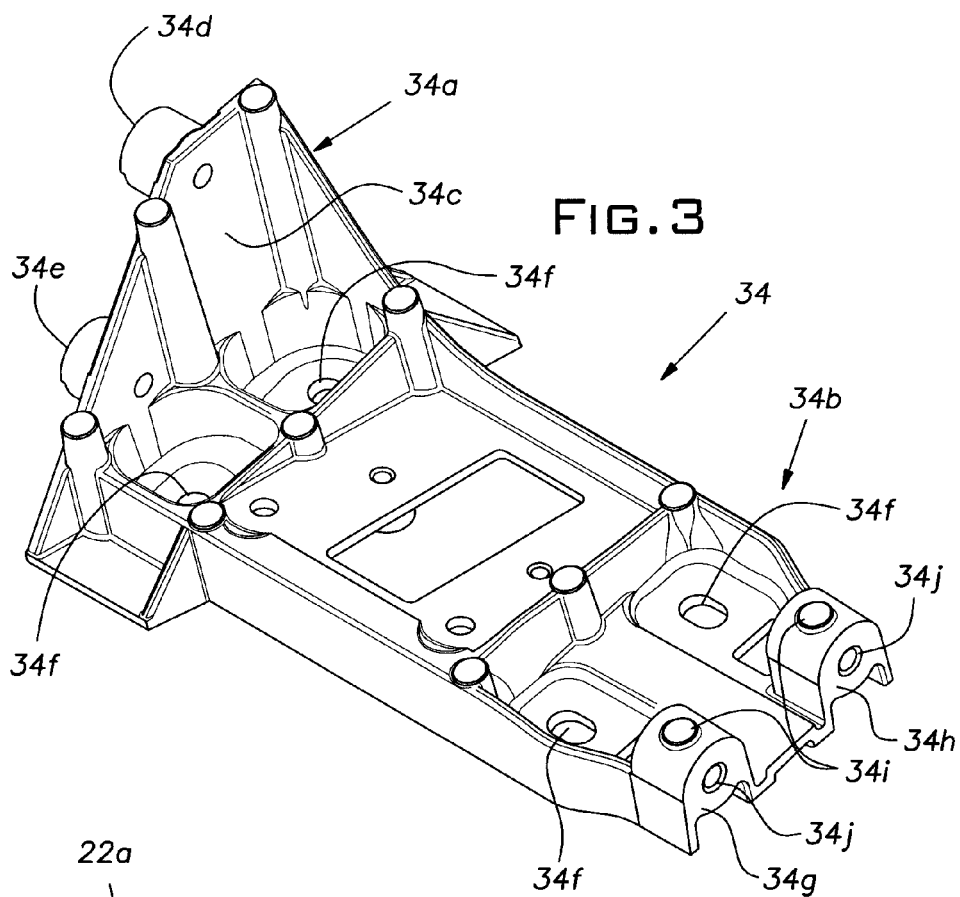
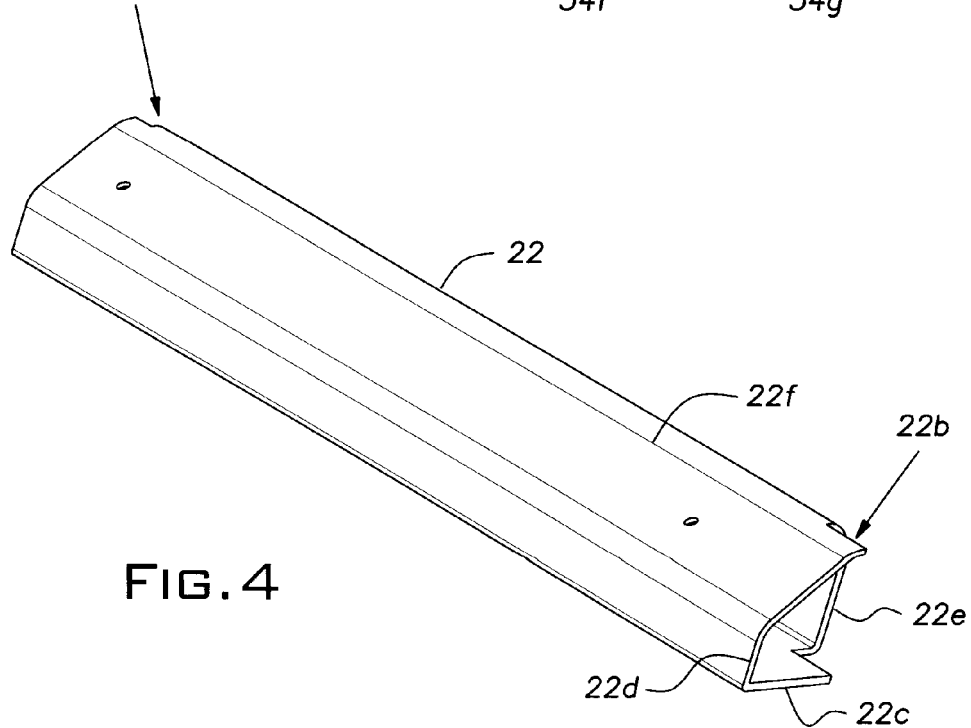

HANGER BEAM ASSEMBLY

BACKGROUND OF THE INVENTION

1. Field of the Invention

The present invention is directed toward an aluminum hanger beam assembly for a vehicle providing a desired frequency of a steering column assembly.

2. Description of Related Art

Many hanger beam assemblies are known in the art. Such assemblies are structural components that extend between the vehicle A-pillars and serve as a mount for the vehicle dashboard, instrument panels, control panels, and a steering column assembly. Conventionally hanger beam assemblies are formed from a variety of steel components, typically steel tubes and stampings, which are mechanically affixed to one another to form a relatively unitary structure.

Unfortunately, while steel is a durable and reliable material, it is relatively heavy. Naturally, there exists a desire to reduce the weight of the vehicle so as to improve fuel efficiency.

Further, steel has an inherent frequency response which, at a desired spacing between the hanger beam assembly and the steering wheel of the associated steering column assembly, results in an undesirable natural frequency. For example, in some vehicles the natural frequency is about 33 HZ, whereas the desired natural frequency is about 42 Hz. Unfortunately, in conventional steel assemblies such a desired natural frequency cannot be attained without adding even more weight to the system.

Therefore, there exists a need in the art for a hanger beam assembly that is made from a lighter material while providing the desired natural frequency to the steering column assembly.

SUMMARY OF THE INVENTION

The present invention is directed toward a hanger beam assembly that is formed from aluminum material, and that provides a desired natural frequency to an associated vehicle steering column assembly.

In accordance with the present invention, the hanger beam assembly includes a first support bracket and a second support bracket, a main beam hanger, a driver beam, a main beam, a main beam hanger, a main beam support, and a main beam support mounting bracket. The first support bracket is adapted to be secured to a first A-pillar and the second support bracket being adapted to be secured to a second A-pillar.

The driver beam has a first end and a second end, with the first end being affixed to the first support bracket and the second end being affixed to the main beam hanger. Each of the driver beam first and second ends defining extending portions that are received in accommodating driver beam receptacles in the first support bracket and the main beam hanger, respectively. The driver beam preferably has an asymmetrical cross-sectional profile.

The main beam has a first end and a second end, with the main beam first end being received in a main beam receptacle formed in the main beam hanger. The main beam second end is received by and affixed to the second support bracket.

The main beam support mounting bracket is adapted to be affixed to a floor of the vehicle and has a vertically tapered end wall. The main beam support has an upper end that is mechanically secured to the main beam hanger and a lower end that is mechanically secured to the main beam support mounting bracket end wall.

BRIEF DESCRIPTION OF THE DRAWINGS

These and further features of the invention will be apparent with reference to the following description and drawings, wherein:

FIG. 1B is a rear elevational view of the hanger beam assembly of FIG. 1A;

FIG. 2 is a side view, partially in cross section, of a portion of the hanger beam assembly as seen along line 2-2 of FIG. 1B;

FIG. 3 is a perspective view of a main beam support mounting bracket;

FIG. 4 is a perspective view of a driver beam;

DETAILED DESCRIPTION OF THE PREFERRED EMBODIMENTS

Figure 1A:
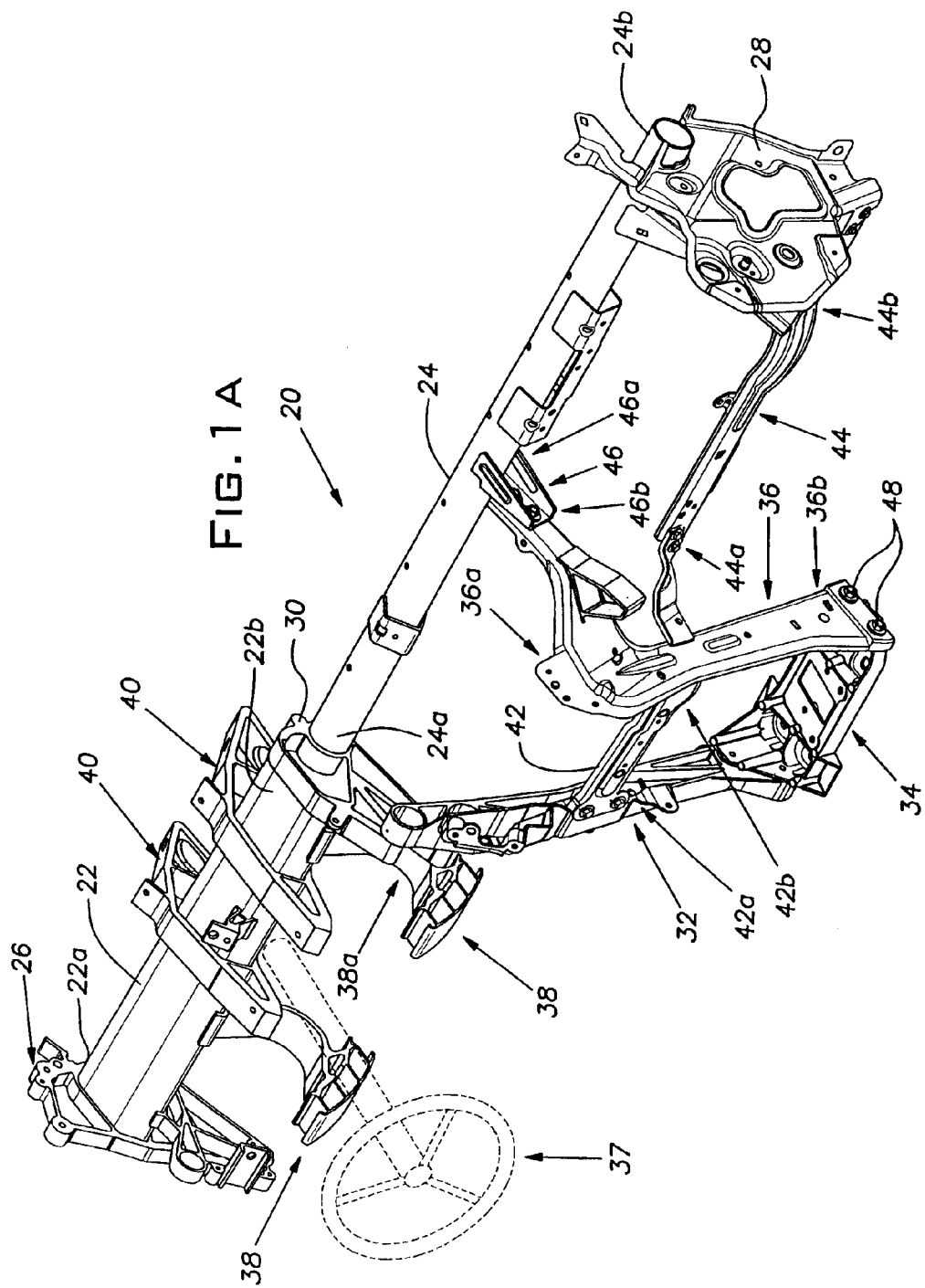
FIG. 1A is a perspective view of the hanger beam assembly according to the present invention.

With reference to the drawings, the present invention is directed toward an improved hanger beam assembly 20 including a driver beam 22, a main beam 24, a first or driver's side support bracket 26, a second or passenger's side support bracket 28, a main beam hanger 30, a main beam support 32, a main beam support mounting bracket 34, a center support 36, dashboard knee bolsters 38, steering column support brackets 40, a stay 42, a lower support beam 44, and a center support bracket 46.

As will be appreciated by those skilled in the art, the hanger beam assembly 20 is a structural assembly to which a vehicle dashboard (not shown) is mounted and on which associated components of the vehicle, such as the steering column assembly, instrument panel, navigation and climate control panels, and glove box, are mounted. As such, the hanger beam assembly 20 extends generally across the entire width of the vehicle, between the driver's side and passenger's side A-pillars (not shown) provided by the vehicle frame.

As will be discussed more fully hereinafter, the components of the hanger beam assembly 20, are preferably formed from aluminum or an aluminum alloy. Components of the hanger beam assembly 20 are welded and/or bolted together to form a unitary, relatively stiff, structure, and cooperate to provide an improved or desirable natural frequency at the steering column assembly 37 (shown in dashed lines in FIG. 1A), which is secured to the hanger beam assembly 20 via the steering column support brackets 40. In the most preferred embodiment, the frequency at the steering column assembly 37 is about 42 Hz.

Figure 1C:
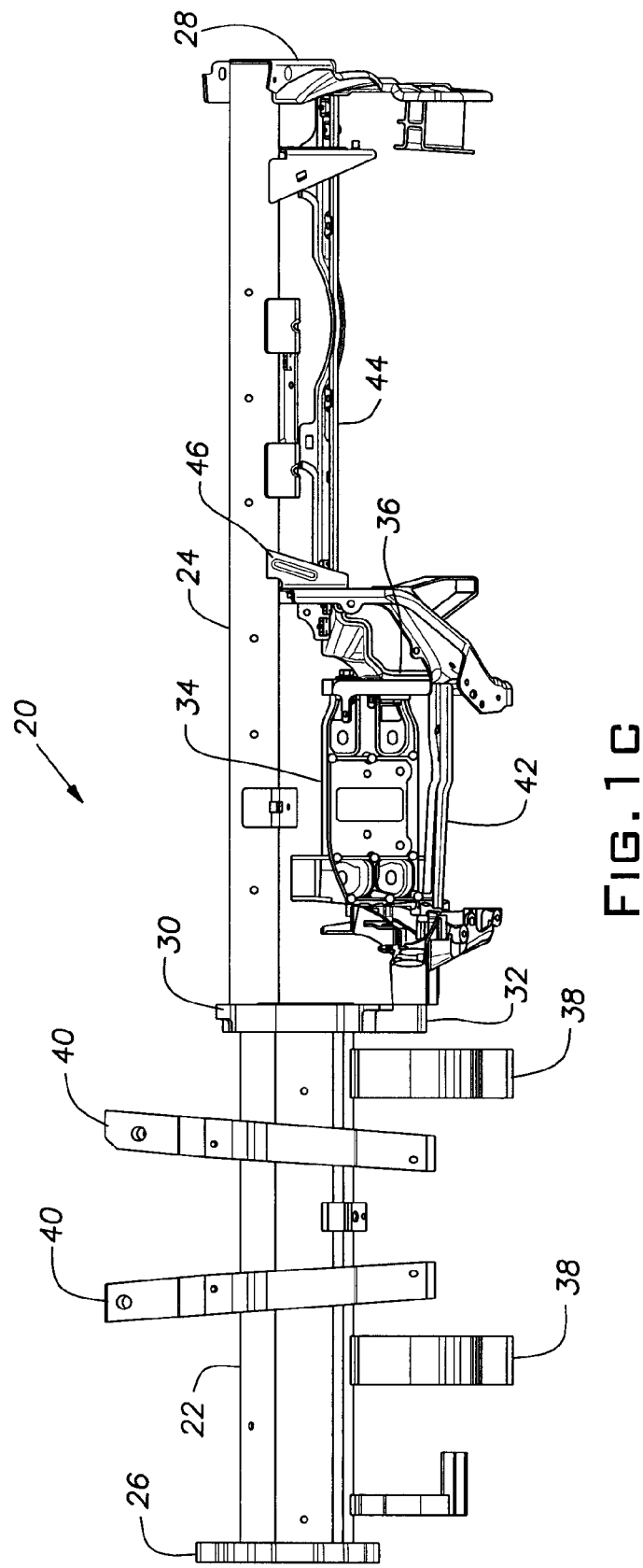
FIG. 1C is a top plan view of the hanger beam assembly of FIGS. 1A and 1B.

Generally, and with primary reference to FIGS. 1A-1C, the first support bracket 26 is secured to the vehicle driver's side A-pillar (not shown), and receives a first end 22a of the driver beam 22. The driver beam 22 extends between the first support bracket 26 and the main beam hanger 30, and has the dashboard knee bolsters 38 and steering column support brackets 40 affixed thereto at predetermined locations. Thus, the second end 22b of the driver beam 22 is received in the main beam hanger 30, and is supported thereby. The main beam hanger 30 supports both the second end 22b of the driver beam 22 and a first end 24a of the main beam 24, and is secured to and extends rearwardly therefrom to an upper end 32a of the main beam support 32.

The main beam support 32 extends downwardly from the main beam hanger 30, and a lower end 32b of the main beam support 32 is secured to a first end 34a of the main beam support mounting bracket 34, which is affixed to a floor frame (not shown) of the vehicle. The main beam 24 extends laterally from the main beam hanger 30 to the second support bracket 28. Thus, a second end 24b of the main beam 24 is secured to the second support bracket 28, which, in turn, is secured to the vehicle passenger's side A-pillar (not shown). The center support 36 extends between the main beam 24 and a second end 34b of the main beam support mounting bracket 34. The stay 42 extends laterally between the main beam support 32 and the center support 36. The lower support beam 44 extends between center support 36 and the second support bracket 28 generally parallel to the main beam 24. While the lower support beam 44 is illustrated as being vertically generally even with the stay 42, this is not required.

More specifically, and initially with reference to FIG. 4, the driver beam 22 is preferably extruded from an aluminum alloy material so as to have a generally flat or planar bottom, front, and rear surfaces 22c, 22d, 22e, while a top surface 22f of the driver beam 22 slopes upwardly from an upper end of the front surface 22d and then curves rearwardly and downwardly to join with an upper end of the rear surface 22e. Providing the driver beam 22 with this asymmetrical cross-sectional profile ensures proper angular orientation of the driver beam 22 and positioning of components affixed thereto, while allowing the driver beam 22 to provide a desired strength for resistance to bending.

Notches are formed in the driver beam 22 at the first and second ends 22a, 22b whereby the rear surface 22e, and portions of the bottom surface 22c and the top surface 22f are removed to define recessed portions whereby remaining portions of the top, front, and bottom surfaces define extending portions, as illustrated. The thus-modified first and second ends 22a, 22b of the driver beam 22 are adapted for receipt in the first support bracket 26 and the main beam hanger 30, respectively. More particularly, the driver beam first and second ends 22a, 22b may 'bottom out' when fully inserted into the first support bracket 26 and main beam hanger 30, as will be apparent from the drawings and the description to follow. By providing this cooperating structure between the driver beam ends 22a, 22b and the first support bracket 26 and the main beam hanger 30, a secure mechanical connection is provided that stiffens the resulting hanger beam assembly 20 without requiring additional mechanical fasteners.

Figure 8:
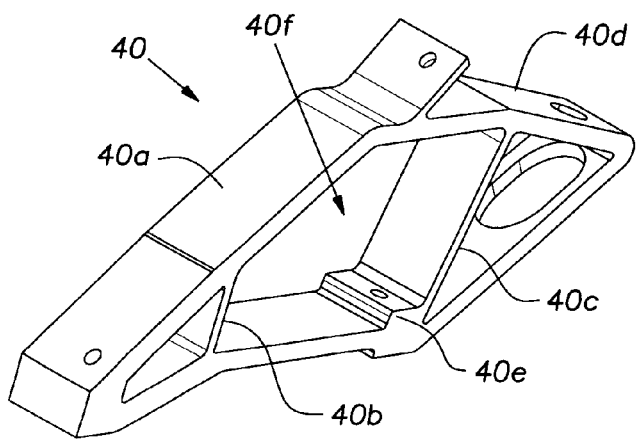
FIG. 8 is a perspective view of a steering column support bracket.
Figure 7:
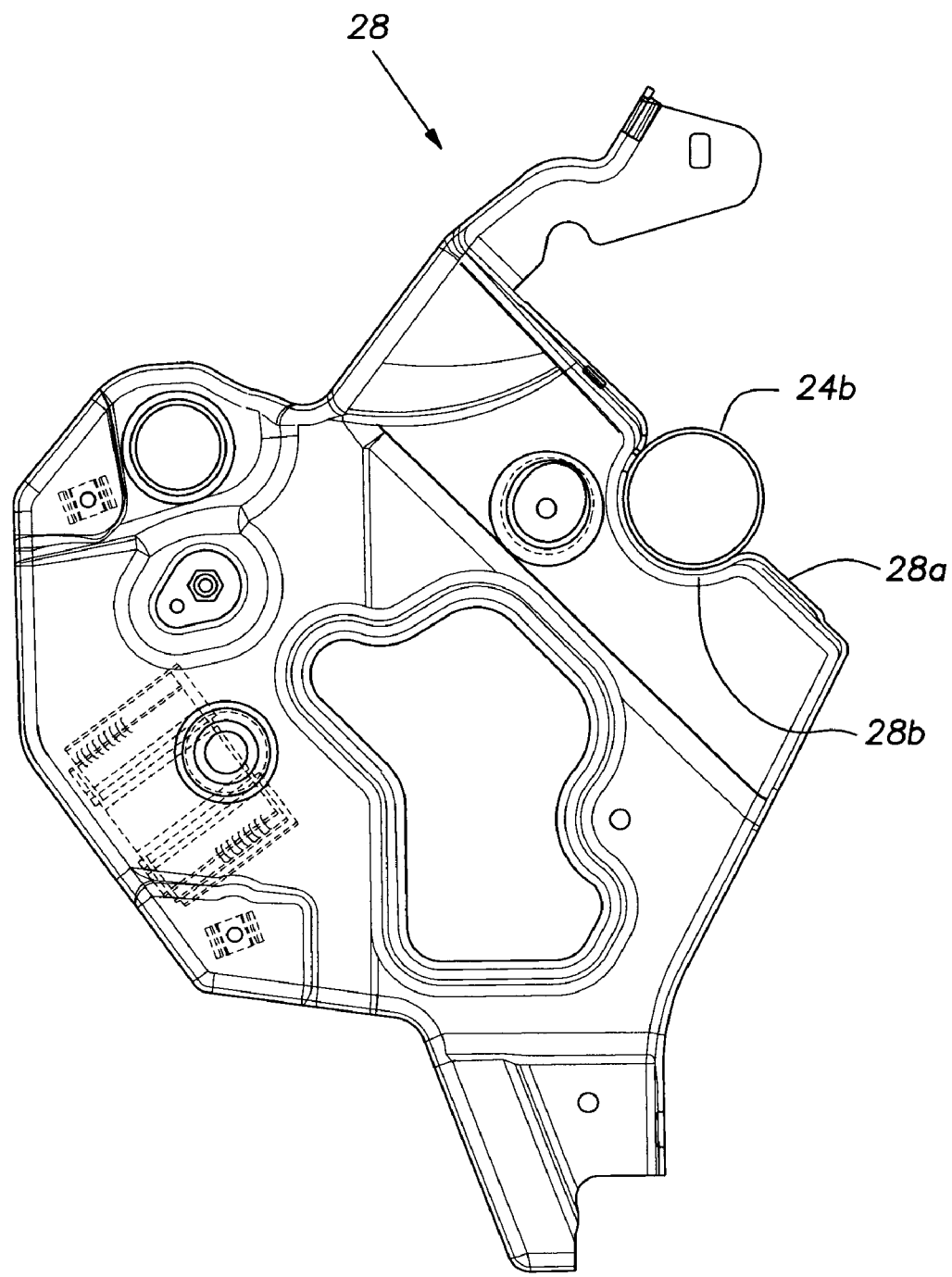
FIG. 7 is an end elevational view primarily illustrating a second support bracket.

Right and left steering column support brackets 40 and right and left knee bolsters 38 are mounted on the driver beam 22 at predetermined locations between the first and second ends 22a, 22b thereof. With reference to FIG. 8, the steering column brackets 40 include a peripheral framework 40a and first and second internal connecting members 40b, 40c. The peripheral framework 40a includes a planar dash mount 40d to which an upper dash panel (not shown) is secured. Between the first and second connecting members 40b, 40c, an inner surface of the peripheral framework includes a raised ledge 40e that serves as a stop or positioning means against which the driver beam rear surface 22e engages.

Thus, the connecting members 40b, 40c and framework 40a cooperate to define an opening 40f in which the driver beam 22 is received, with the driver beam front surface 22d abutting a rearwardly facing surface of the first connecting member 40b and the bottom surface 22c and rearward portion of the top surface 22f of the driver beam 22 engaging the inner surfaces of the peripheral framework 40a. As such, the steering column mounting brackets 40 are initially slidably arranged on the driver beam 22. Once the steering column mounting brackets 40 are placed in the predetermined positions, they are affixed to the driver beam 22 by placing a weld bead between each side of the steering column brackets 40 and the driver beam 22. Welding the steering column support brackets 40 to the driver beam 22 reinforces the driver beam 22 and further stiffens the resulting hanger beam assembly 20.

The knee bolsters 38, which are positioned on each side of the steering column brackets 40, include a mounting end 38a having an upwardly open U-shaped profile that fits around the front, bottom, and rear surfaces 22d, 22c, 22e of the driver beam 22. Once the knee bolsters 38 are in the predetermined position, the mounting end 38a is welded to the driver beam 22 by placing a weld bead between each lateral side of the mounting ends 38a and the driver beam bottom, front, and rear surfaces 22c, 22d, 22e.

Figure 5:
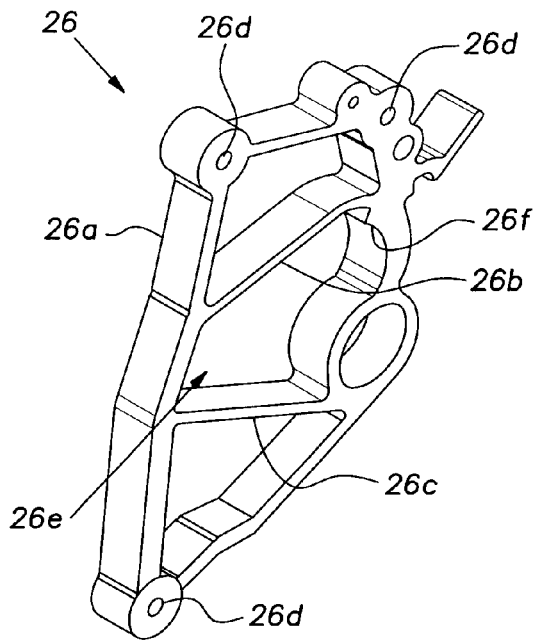
FIG. 5 is a perspective view of a first support bracket.

With reference to FIG. 5, the first support bracket 26 is preferably an extruded and subsequently machined aluminum part. The first support bracket 26 includes a peripheral framework 26a and upper and lower cross members 26b, 26c. The peripheral framework 26a defines a series of mounting holes 26d by means of which the first support bracket 26 may be mechanically affixed, via mounting screws, to the driver's side A-pillar. Preferably, the first support bracket 26 is attached at three points to the A-pillar, as illustrated. The cross members 26b, 26c cooperate with the peripheral framework 26a to define a receptacle 26e into which the driver beam first end 22a is inserted and received. The peripheral framework includes an inner surface defining a raised ledge 26f. The ledge 26f serves as a stop to limit insertion of the driver beam first end into the receptacle 26e, as noted previously.

Once the first end 22a of the driver beam 22 is inserted into the receptacle 26e provided by the first support bracket 26, the first support bracket 26 is welded to the driver beam 22, preferably by laying a weld bead between the first support bracket upper cross member 26b and the top surface 22f of the driver beam 22, so as to unify or integrate the first support bracket 26 and the driver beam 22. By interfitting and subsequently welding the driver beam 22 and the first support bracket 26, the stiffness of the resulting connection is markedly increased as compared to the prior art.

Figure 6:
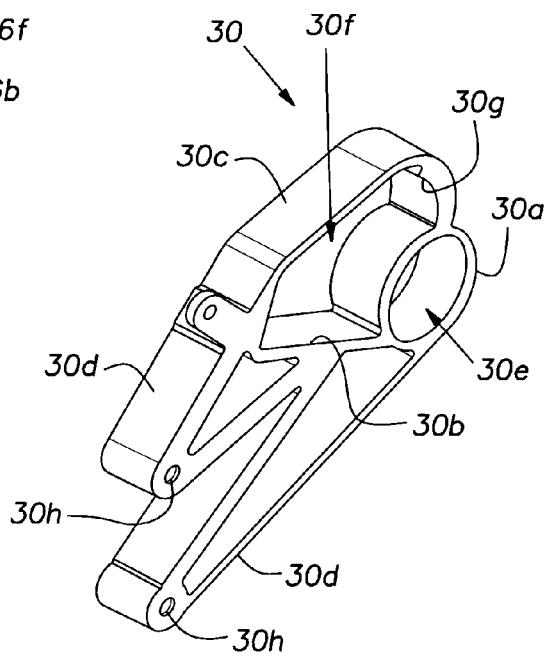
FIG. 6 is a perspective view of a main beam hanger.

With reference to FIG. 6, the main beam hanger 30 has an open lattice-like structure including a circular portion 30a, a crosspiece 30b, a curved top 30c, and a pair of mounting arms 30d. The circular portion 30a defines a main beam receptacle 30e. The circular portion 30a, crosspiece 30b, and curved top 30c cooperate to define a driver beam receptacle 30f. The inner surface of the curved top 30e includes a ledge 30g that serves as a stop to limit insertion of the driver beam second end 22b therein.

The driver beam receptacle 30f is shaped and adapted to receive the second end 22b of the driver beam 22 from one side thereof facing toward the first support bracket 26.

Similarly, the main beam receptacle 30e is shaped and adapted to receive a first end 24a of the main beam 24 from the opposite side thereof (i.e., side facing toward the second support bracket 28). The preferred and illustrated main beam 24 is generally tubular in shape, and is preferably an aluminum extrusion.

Once the second end 22b of the driver beam 22 is inserted into the driver beam receptacle 30f provided by the main beam hanger 30 (i.e., bottom out), the main beam hanger 30 is welded to the driver beam 22, preferably by laying a weld bead between the hanger curved top 30c and the top surface 22f of the driver beam 22, so as to unify or integrate the hanger 30 and the driver beam 22. As with the connection between the driver beam and the first support bracket 26, the interfitting of the driver beam 22 and the hanger 30 serves to greatly increase the resulting stiffness and structural integrity, as compared to the prior art. Similarly, once the first end 24a of the main beam 24 is inserted into the main beam receptacle 30e, the main beam 24 is welded to the main beam hanger 30, preferably by a pair of welding beads placed on diametrically opposite positions along the periphery of the main beam 24, so as to positively secure the main beam 24 to the main beam hanger 30 for installation in the host vehicle and subsequent receipt of structural components.

As such, the main beam hanger 30 is positively secured to both the main beam 24 and the driver beam 22 by a plurality of welds. Further, the structural interlocks between the main beam 24, the driver beam 22, and the associated receptacles 26e, 30f, 30e serve to both position and stabilize the main beam hanger 30. Finally, the asymmetrical shape of the driver beam 22 insures that the main beam hanger 30 is properly angularly oriented.

The main beam 24 extends laterally from the main beam hanger 30 to the second support bracket 28. An upper surface 28a of the second support bracket 28 defines a semi-circular recess 28b in which the second end 24b of the main beam 24 rests. Preferably, the main beam second end 24b is welded to the second support bracket 28 by placing welding beads at positions on a rearwardly laterally outwardly facing surface of the second support bracket 28 and along a upper and lower peripheral surfaces of the main beam second end 24b.

The main beam hanger mounting arms 30d extend rearwardly from the main beam hanger 30, and are positioned and adapted to be fixed to the main beam support 32 by a pair of fasteners that extend through threaded openings 30h formed in the mounting arms 30d adjacent their distal ends that align with corresponding threaded holes 32d formed in the main beam support 32.

Figure 9:
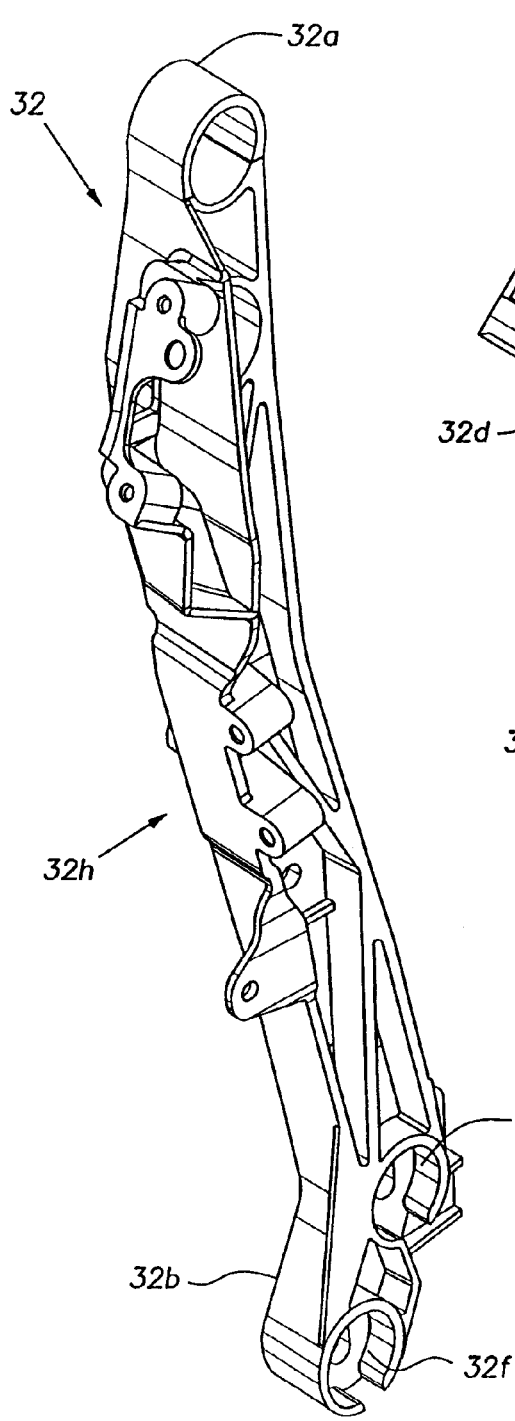
FIG. 9 is a perspective view of a main beam support.
Figure 10:
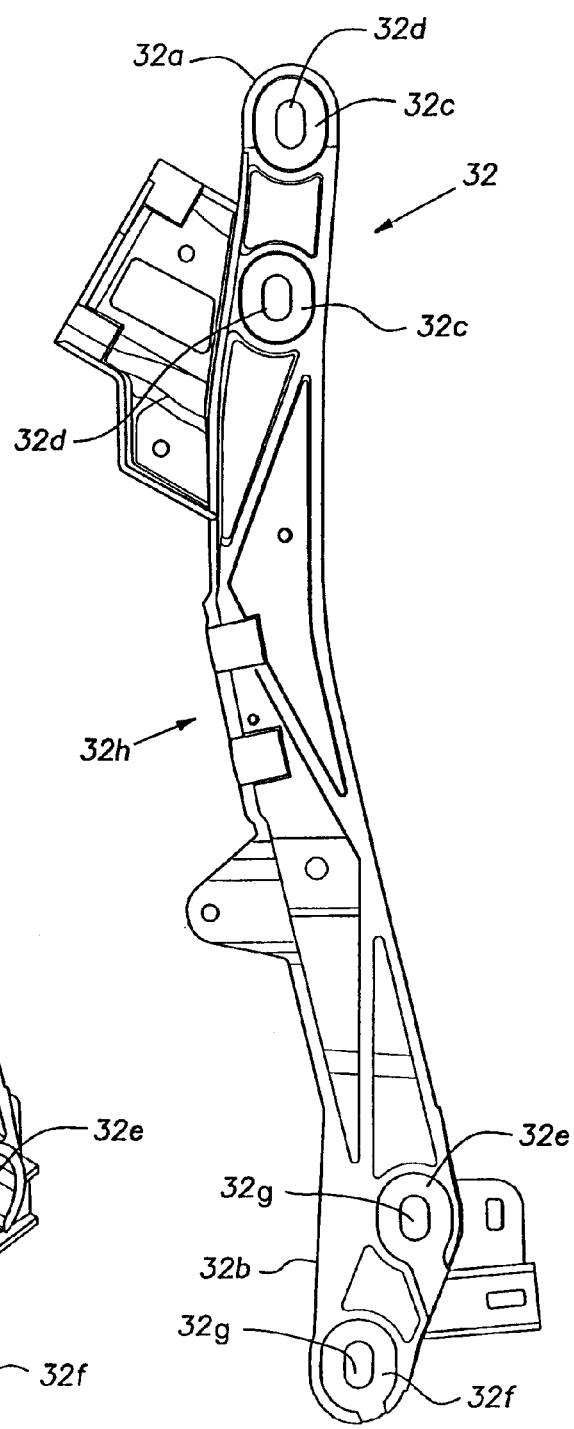
FIG. 10 is a side elevational view of the main beam support of FIG. 9.

With reference to FIGS. 9-10, the main beam support 32 is preferably an aluminum casting and has an upper end 32a and a lower end 32b. It will be appreciated that the main beam support 32 is a rather complex part that includes a first lateral surface facing toward the first support bracket 26, a second lateral surface facing toward the second support bracket 28, a rear surface facing toward a rear of the vehicle, and a front surface facing toward a front of the vehicle.

The first lateral surface of the main beam support upper end 32a includes mounting pads 32c that define the pair of threaded holes 32d for receipt of the fasteners for securement of the main beam hanger mounting arms 30d thereto. More specifically, the mounting arms 30d are brought into face-to-face engagement with the mounting pad 32c of the main beam support upper end 32a, and the openings 30h and holes 32d are aligned to permit the threaded fasteners to be installed to mechanically affix the main beam hanger 30 to the main beam support 32.

The lower end 32b of the main beam support 32 includes first and second sockets 32e, 32f that are adapted to receive corresponding mounting posts 34d, 34e extending from the main beam support mounting bracket 34. The first and second sockets 32e, 32f are formed in the second lateral surface of the main beam support 32 such that the sockets 32e, 32f are open toward the second support bracket 28. Preferably, the sockets 32e, 32f are somewhat elongated vertically, and have a downwardly directed extension, as illustrated. Further, each of the sockets 32e, 32f has a bottom surface (i.e., laterally facing toward the first support bracket 26) that is closed with the exception of a slotted opening 32g that is provided to permit a threaded fastener to extend therethrough. Thus, each socket 32e, 32f may be considered to be a laterally open blind bore that is adapted to receive the associated mounting post 34d, 34e. The first socket 32e is disposed relatively vertically above and rearward of the second socket 32f. The second socket 32f is generally disposed adjacent a lowermost end of the main beam support 32.

Intermediate the upper and lower ends 32a, 32b, the main beam support 32 includes a pair of mounts 32h that have threaded openings formed therein. The mounts 32h receive a first end 42a of the stay 42, and the threaded openings receive fasteners to mechanically affix the stay 42 to the main beam support 32.

With reference to FIG. 3, the main beam support mounting bracket 34 is preferably an aluminum casting that has a generally rectangular footprint and includes a relatively raised first lateral end 34a facing toward the first mounting bracket 26, and a relatively shorter second lateral end 34b facing toward the second mounting bracket 28. The raised lateral end 34a has an end wall 34c from which the first and second mounting posts 34d, 34e laterally extend. The end wall 34c tapers as it extends vertically so as to provide a structurally stable attachment or mounting structure between the main beam support 32 and the floor frame. The first mounting post 34d is at a position that is relatively raised as compared to the second mounting post 34e. Thus, the first mounting post 34d is positioned to be received in the first socket 32e, whereas the second mounting post 34e is disposed at a position to be received in the second socket 32f. Each of the first and second mounting posts 34d, 34e is generally cylindrical and has a threaded bore formed centrally or axially therein through which a fastener, such as a bolt, is received to mechanically affix the main beam support lower end 32b to the main beam support mounting bracket 34.

Preferably, the fasteners are inserted through the slotted openings 32g in the bottom wall of the sockets 32e, 32f and threaded into the mounting posts 34d, 34e so as to mechanically affix or clamp the main beam support 32 to the main beam support mounting bracket 34. It will be appreciated that receipt of the mounting posts 34d, 34e in the sockets 32e, 32f reduces or limits possible motion of the main beam support 32 in the forward/rearward and up/down directions, while the fasteners reduce or eliminate possible lateral motion of the main beam support 32 relative to the main beam support mounting bracket 34.

A base or central section of the main beam support mounting bracket 34 provides a series of slotted mounting openings 34f through which threaded fasteners such as bolts extend for threaded engagement or receipt by corresponding threaded openings (not shown) in the floor or frame of the vehicle. Preferably, two of slotted mounting openings 34f are provided adjacent the first end 34a of the main beam support mounting bracket 34 and two of the slotted mounting openings 34f are provided adjacent the second end 34b of the main beam support mounting bracket 34.

Thus, the main beam support 32 is mechanically affixed to the main beam support mounting bracket 34, and the main beam support mounting bracket 34 is mechanically affixed to the vehicle floor frame. Further, the main beam support mounting bracket posts 34d, 34e are received in the main beam support sockets 32e, 32f at a position vertically and horizontally offset from one another. The multi-point mechanical attachment and multi-plane engagement between the main beam support 32 and main beam support mounting bracket 34 results in a structurally stiff and secure integration of the main beam support 32 and main beam support mounting bracket 34.

The second end 34b of the main beam support mounting bracket 34 includes first and second semi-cylindrical mounting pads 33g, 33h over which a lower end 36b of the center support 36 is placed, as will be apparent from the following description. The first and second mounting pads 33g, 33h extend vertically upwardly and have a small locating stub 34i at their upper end, and a laterally facing surface in which a threaded bore 34j is formed for receipt of a mounting fastener to secure the center support 36 thereto.

The center support bracket 46 has a first end 46a secured to the main beam 24 and a second end 46b to which an upper end 36a of the center support 36 is secured. The center support bracket first end 46a is semi-circular and extends partway around the main beam 24, and the center support bracket 46 extends rearwardly therefrom. Preferably, the center support bracket 46 is secured to the main beam 24 by upper and lower weld beads disposed between the free upper and lower terminal surfaces of the center support bracket 46 and the main beam 24.

The center support 36 is generally shaped as an inverted L such that while the upper end 36a of the center support 36 is affixed to the second end 46b of the center support bracket 46 and extends rearwardly therefrom, a main portion of the center support 36 extends vertically downward to the lower end 36b of the center support 36. Intermediate the upper and lower ends 36a, 36b, the center support 36 is secured to the second end 42b of the stay 42, which serves to stabilize and maintain spacing between the main beam support 32 and the center support 36. Also, a first end 44a of the lower support beam 44 is secured to the center support 36 at a location intermediate the upper and lower ends 36a, 36b thereof, and extends first forwardly and then laterally toward the second support bracket 28, as illustrated. The second end 44b of the lower support beam 44 is bolted to the second support bracket 28.

The lower end 36b of the center support 36 includes first and second downwardly open semi-cylindrical recesses (not shown). The recesses are also open in a lateral direction facing toward the first support bracket 26, such that the recesses define blind bores. Further, the recesses include a vertical extension (not shown) for receipt of the mounting stubs 34i extending upwardly from the mounting pads 33g, 33h. A pair of threaded openings extends laterally through the lower end of the center support 36 and are aligned with the threaded bores 34j in the laterally facing surfaces of the mounting pads 33g, 33h.

Thus, when the center support 36 is positioned on the main beam support mounting bracket 34, the mounting stubs 34i extend into the recess extensions, the mounting pads 33g, 33h are received in the recesses, and then the bolts 48 (FIG. 1A) are threaded into the aligned openings and bores in the center support 36 and mounting pads 33g, 33h to mechanically affix the center support 36 to the main beam support mounting bracket 34.

While it is considered apparent that the hanger beam assembly 20 may be assembled in many different ways, the following is provided to generally describe one preferred method or sequence of assembly. During assembly, preferably the knee bolsters 38 and steering column support brackets 40 are first disposed at their predetermined positions along the length of the driver beam 22, and then welded thereto. Thereafter, the main beam hanger 30 is placed on the main beam 24, and welded thereto, and the first and second ends 22a, 22b of the driver beam 22 are pushed into the receptacles 26e, 30f in the first support bracket 26 and main beam hanger 30, respectively, and then welded thereto. This defines a first subassembly of the hanger beam assembly 20. Then, the second end 24b of the main beam 24 placed on the semi-circular recess 28b of the second support bracket 28 and welded to the second support bracket 28, and the center support bracket 46 is positioned on the main beam 24 and welded thereto. This defines a second subassembly for the hanger beam assembly 20.

Thereafter, the first and second subassemblies are assembled by pushing the first end 24a of the main beam 24 into the receptacle 30e of the main beam hanger 30, and welding the main beam first end 24a to the main beam hanger 30. The so-assembled first and second subassemblies define a beam component.

The stay second end 42b and lower support beam first end 44a are welded to the center support 36 to define a center support assembly. Thereafter, the center support assembly is secured to the main beam support mounting bracket 34 by bolting the lower end 36b of the center support 36 to the mounting bracket 34. Then, the main beam support 32 is bolted to the main beam hanger 30 and the main beam support mounting bracket 34 to substantially complete the hanger beam assembly 20. Thereafter, the assembled hanger beam assembly 20 may be installed in a vehicle by bolting the first support bracket 26 to the driver's side A-pillar, bolting the second support bracket 28 to the passenger's side A-pillar, and bolting the main beam support mounting bracket 34 to the vehicle floor/frame.

The hanger beam assembly 20 of the present invention provides a relatively light-weight structure to which the steering column assembly, dashboard and associated components may be secured. Further, the components of the hanger beam assembly 20 provide a desired natural frequency at the steering wheel. More specifically, it has been found that the natural frequency at the steering wheel is affected by the hanger beam assembly 20 materials as well as the spacing between the steering column and the driver beam 22 to which the steering column assembly, via the steering column support brackets 40, is secured. By forming the hanger beam assembly 20 from aluminum, it is possible to provide a desired natural frequency (e.g., 42 Hz) at the steering column assembly 37 while retaining a relatively short spacing. Notably, the structural integration and cooperation between the driver beam 22, first support bracket 26, steering column support brackets 40, main beam hanger 30, main beam support 32, and main beam support mounting bracket 34 is considered to directly affect the frequency response at the steering column assembly 37. Thus, by securely affixing these components to one another, and by providing a stiff connection to the vehicle floor via the main beam support mounting bracket 34, the desired natural frequency at the steering column assembly 37 results. This result is an improvement over known steel hanger beam assemblies in which, at the identical desired spacing, inherently provides a natural frequency that is reduced (i.e., about 33 Hz) and therefore has an undesirably frequency response.

What is claimed is:

1. A hanger beam assembly for use in a vehicle, comprising:
    a first support bracket and a second support bracket, said first support bracket being adapted to be secured to a first A-pillar and said second support bracket being adapted to be secured to a second A-pillar;
    a main beam hanger;
    a driver beam having a first end and a second end, said first end being affixed to said first support bracket, said second end being affixed to said main beam hanger, wherein one of the first and second ends has recessed portions on an end face;
    a main beam having a first end and a second end, said main beam first end being affixed to said main beam hanger, said main beam second end being received by said second support bracket;
    a main beam support;
    a main beam support mounting bracket;
    wherein said main beam support mounting bracket is is adapted to be affixed to a floor of the vehicle, and wherein said main beam support has an upper end that is mechanically secured to said main beam hanger and a lower end that is mechanically secured to said main beam support mounting bracket.

2. The hanger beam assembly according to claim 1, wherein said main beam hanger defines a driver beam receptacle in which said driver beam second end is received.

3. The hanger beam assembly according to claim 1, wherein said main beam hanger defines a main beam receptacle in which the main beam first end is received.

4. The hanger beam assembly according to claim 1, where said second support bracket defines a recess in which said main beam second end is received.

5. The hanger beam assembly according to claim 1, wherein said driver beam has an asymmetrical cross-sectional profile.

6. The hanger beam assembly according to claim 1, wherein said first support bracket defines a receptacle in which said driver beam first end is received.

7. The hanger beam assembly according to claim 2, wherein said main beam hanger defines a driver beam receptacle in which said driver beam second end is received.

8. The hanger beam assembly according to claim 7, wherein said main beam hanger defines a main beam receptacle in which the main beam first end is received.

9. The hanger beam assembly according to claim 8, where said second support bracket defines a recess in which said main beam second end is received.

10. The hanger beam assembly according to claim 9, wherein said driver beam has an asymmetrical cross-sectional profile.

11. The hanger beam assembly according to claim 1, wherein each of said first support bracket and said main beam hanger define a receptacle, and wherein extending portions of the driver beam first and second ends extend into the receptacles formed in the first support bracket and the main beam hanger, respectively.

12. The hanger beam assembly according to claim 11, where said second support bracket defines a recess in which said main beam second end is received.

13. The hanger beam assembly according to claim 12, wherein said driver beam has an asymmetrical cross-sectional profile.

14. The hanger beam assembly according to claim 13, wherein the driver beam is welded to the first support bracket and to the main beam hanger.

15. The hanger beam assembly according to claim 14, wherein the main beam support mounting bracket includes a vertically tapered end wall that is affixed to the main beam support lower end.

16. The hanger beam assembly according to claim 15, wherein said hanger beam assembly cooperates with a steering column assembly to provide desired natural frequency at said steering column assembly.

17. A hanger beam assembly for use in a vehicle, comprising:
    a first support bracket and a second support bracket, said first support bracket being adapted to be secured to a first A-pillar and said second support bracket being adapted to be secured to a second A-pillar;
    a main beam hanger;
    a driver beam having a first end and a second end, said first end being affixed to said first support bracket, said second end being affixed to said main beam hanger, each of said first and second ends defining extending portions that are received in accommodating driver beam receptacles in the first support bracket and the main beam hanger, respectively, said driver beam having an asymmetrical cross-sectional profile, wherein one of the first and second ends has recessed portions on an end face;
    a main beam having a first end and a second end, said main beam first end being received in a main beam receptacle formed in said main beam hanger, said main beam second end being received by and affixed to said second support bracket;
    a main beam support;
    a main beam support mounting bracket having a vertically tapered end wall; wherein said main beam support mounting bracket is adapted to be affixed to a floor of the vehicle, and wherein said main beam support has an upper end that is mechanically secured to said main beam hanger and a lower end that is mechanically secured to said main beam support mounting bracket end wall.

18. The hanger beam assembly according to claim 17, wherein said hanger beam assembly cooperates with a steering column assembly to provide desired natural frequency at said steering column assembly.

* * * * *